May 1, 1934.　　　A. E. DENTLER　　　1,956,671
SHOCK ABSORBER
Filed June 1, 1931
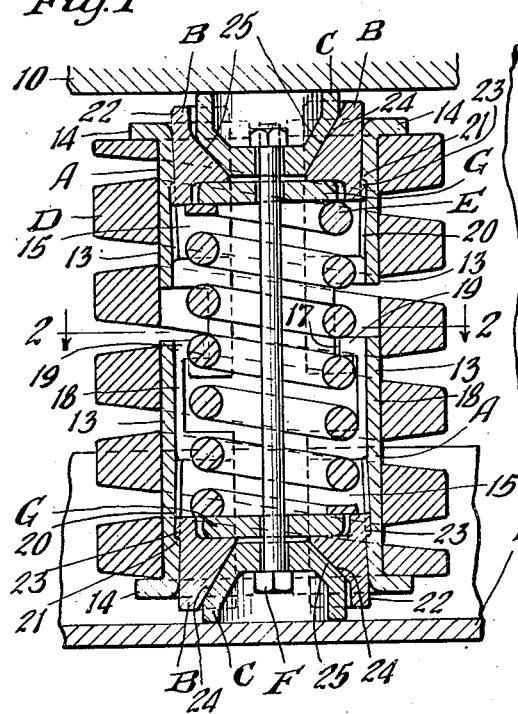
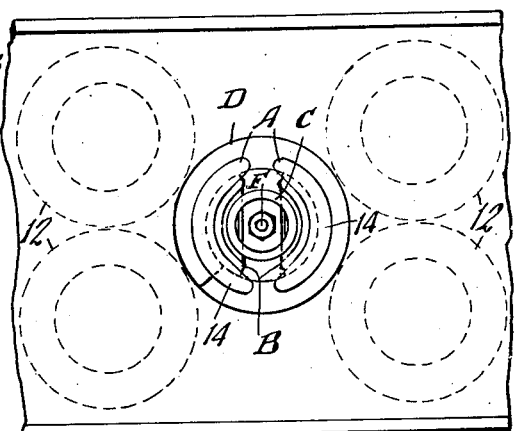
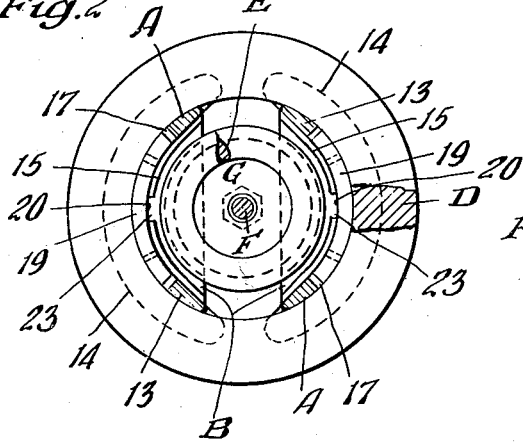
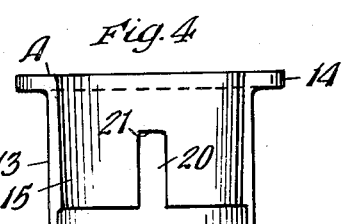
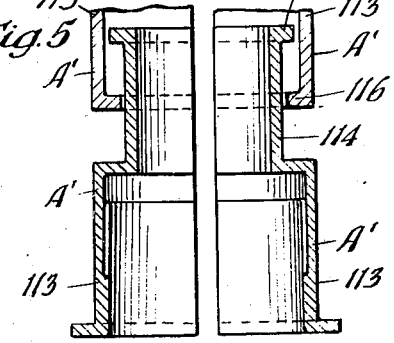
Witness
Wm. Geiger
Inventor
Arnold E. Dentler
By Henry Fuchs. Atty.

Patented May 1, 1934

1,956,671

UNITED STATES PATENT OFFICE 1,956,671

SHOCK ABSORBER

Arnold E. Dentler, Chicago, Ill., assignor to W. H. Miner, Inc., Chicago, Ill., a corporation of Delaware Application June 1, 1931, Serial No. 541,397

7 Claims. (Cl. 267—9)

This invention relates to improvements in shock absorbers.

One object of the invention is to provide a shock absorbing mechanism of the friction type including a pair of sectional shells movable toward each other, a heavy coil spring surrounding the shells, yieldingly opposing relative approach thereof and holding the sections of each shell assembled, a pair of friction shoes slidable within each sectional shell and having frictional contact with the inner walls thereof, a spring resistance interiorly of the shells opposing relative approach of the two pairs of shoes, and wedge members at opposite ends of the mechanism cooperating with the shoes, wherein the parts are so arranged that a preliminary relatively light action will be had during which the outer heavy coil spring is compressed, followed during the remainder of the compression of the mechanism by a heavier resistance produced through relative movement of the friction shoes and shells resisted by the interior spring.

Another object of the invention is to provide a shock absorber of the character specified in the preceding paragraph which is especially adapted for use in connection with spring clusters of car trucks to produce a dampening action, thereby preventing excessive recoil of the springs and reducing the vibrations of the car body to a minimum, thereby protecting the lading from damage.

A more specific object of the invention is to provide a shock absorbing mechanism of the double-ended type including sectional friction shells at opposite ends of the mechanism, a pair of friction shoes having sliding frictional engagement with each shell, a wedge at each end of the mechanism for forcing the shoes apart, a spring means opposing relative movement of the parts, wherein means is employed for restricting relative separation of the parts in full release with the shells separated to a predetermined extent which is less than the full compression stroke of the mechanism, and the wedge blocks projecting outwardly of the shells.

Other objects of the invention will more clearly appear from the description and claims hereinafter following.

In the drawing, forming a part of this specification, Figure 1 is a vertical sectional view through the body bolster and spring plank of a car truck, illustrating my improved shock absorbing mechanism in connection therewith, the shock absorbing mechanism being also shown in vertical section. Figure 2 is a horizontal sectional view, corresponding substantially to the line 2—2 of Figure 1. Figure 3 is a plan view of the spring plank illustrated in Figure 1, showing my improved shock absorber employed in connection with a cluster of truck springs, four such springs being indicated in dotted lines. Figure 4 is a detailed view of the connecting means between two of the sections of the shells at opposite ends of the mechanism, one of the shell sections being partly broken away. And Figure 5 is a vertical sectional view through the sectional shells, illustrating another embodiment of the connecting means between the shells.

In said drawing, 10 indicates the bottom portion of the truck bolster of a railway car, and 11 the cooperating spring plank. My improved shock absorbing mechanism is illustrated as interposed between the truck bolster and the spring plank and associated with four coil spring members 12—12 which surround the same. The improved shock absorbing device cooperates with the truck springs 12—12 to dampen the recoil of said springs. As will be evident, my improved shock absorbing device is not limited to use in connection with truck springs but may be employed as a shock absorber for railway draft gears.

My improved shock absorbing mechanism, as shown in Figures 1 to 4 inclusive, comprises broadly a pair of sectional friction shells A—A, two pairs of friction shoes B—B and B—B, two wedge blocks C—C, a relatively heavy outer coil spring D, an inner lighter spring E, a retainer bolt F, and a pair of spring followers G—G.

The friction shells A—A are disposed at opposite ends of the mechanism, and each is composed of two parts. With the exception that the lower friction shell is longer than the upper shell, the same are of similar design. Each shell A is composed of two sections 13—13 which are curved transversely, the two sections together forming a complete two-part cylindrical tubelike shell. At the outer end, each section 13 is provided with a laterally projecting flange 14, for a purpose hereinafter pointed out. On the inner side, each section 13 has a curved, substantially cylindrical interior friction surface 15 with which the corresponding shoe B cooperates. As clearly illustrated in Figure 1, the opposed friction surfaces 15 converge inwardly of the mechanism. At the inner end, each section 13 of the upper shell is provided with an opening 16 which communicates with a slot 17 forming guide means for a tongue or arm 18 projecting from the corresponding shell section 13 at the bottom end of the mechanism. The arm 18 is provided with an enlarged end portion forming a T-head 19 which slides within the opening 16 and has shouldered engagement with the outer end walls of the same to limit longitudinal separation of the two shell members. The friction surface of each shell section 13 is provided with a relatively narrow, longitudinally extending slot 20 which terminates inwardly of the outer end of the shell section, thereby presenting a stop shoulder 21.

The spring D surrounds the two sectional shells and has the opposite ends thereof abutting the flanges 14—14 of said shells. As will be evident, the coil spring D holds the sections of the two shells assembled and resists outward spreading of the same. In addition, the spring D yieldingly opposes relative approach of the two shells lengthwise of the mechanism.

The pairs of shoes B—B which cooperate with the two sectional shells are of like design. The shoes B—B of each pair have outer, substantially cylindrical friction surfaces 22—22 which cooperate with the interior friction surfaces of the sections of the corresponding shell. The shoes B are so arranged that one of the same cooperates with each shell section 13. At the inner end each shoe has a lug 23 which is guided within the slot 20 of the corresponding shell section and cooperates with the shoulder 21 of said slot to limit outward movement of the shoe with respect to said shell section. As will be evident, in addition to limiting the outward movement of the shoe with respect to the section 13 of the corresponding shell, the shouldered engagement of the shoe with this section of the shell acts to restore the latter to normal position. On the inner side, each shoe is provided with a substantially flat wedge face 24. As shown, the wedge face 24 of one of the shoes of each pair is inclined at a relatively keener angle with respect to the longitudinal axis of the mechanism than the face of the other shoe.

The wedge blocks C—C, which are two in number, are disposed at opposite ends of the mechanism and have pairs of wedge faces 25—25 and 25—25 at opposite sides thereof. The wedge faces 25—25 of each wedge block C cooperate with the wedge faces 24—24 of the corresponding pair of shoes B—B and are similarly inclined to the faces of the shoes to properly cooperate therewith.

The spring resistance E is disposed within the sectional friction shells A—A and opposes relative longitudinal approach of the two pairs of friction shoes B—B and B—B. The spring followers G—G are interposed between the spring E and the friction shoes.

The entire mechanism is held assembled by the retainer bolt F which has its opposite ends anchored to the wedge blocks C—C. When my improved shock absorber, as shown in Figures 1, 2, 3, and 4, is employed in connection with a cluster of truck springs, the wedge blocks C—C bear respectively on the bottom surface of the truck bolster and the top surface of the spring plank.

The operation of my improved shock absorbing device as illustrated in Figures 1, 2, 3, and 4, during a compression stroke, is as follows: The wedge blocks C—C will be forced toward each other during the first part of the compression, thereby wedging the shoes B—B outwardly into tight frictional engagement with the interior friction surfaces of the sectional shells A—A. Inasmuch as the frictional resistance opposing movement between the shoes and friction shells is greater than the spring resistance provided by the springs D and E, the friction shells will be moved toward each other lengthwise of the mechanism. This action will continue until the inner end of the upper shell A engages the opposed end of the lower shell, whereupon the shoes will be forced to move with respect to the corresponding shell members. During this action, movement of the two pairs of shoes toward each other lengthwise of the mechanism is resisted by the inner spring E. The compression of the mechanism will be limited by engagement of the bolster 10 and spring plank 11 with the outer ends of the top and bottom shells A—A. When the actuating force is reduced, the expansive action of the springs D and E will return all the parts to normal position. Longitudinal separation of the shells A—A will be limited by the shouldered engagement of the arms 19 of the lower shell with the abutment walls of the openings 16 of the upper shell. Inasmuch as the friction shoes B—B have shouldered engagement with the sections of the friction shells, expansion of the inner spring E will assist in restoring the shells to normal position. Further, the shouldered engagement of the shoes with the shells limits the outward movement of the shoes so as to properly position the same with respect to the shells. Expansion of the entire mechanism is limited by the retainer bolt F which arrests outward movement of the two wedge blocks.

Referring next to the embodiment of the invention shown in Figure 5, the construction of the shock absorbing mechanism is identical with that hereinbefore described in connection with Figures 1 to 4 inclusive, with the exception that the means for connecting the lower friction shell to the upper shell is of a different design. As shown in Figure 5, the lower shell, which is indicated by A', is composed of two sections 113—113 similar to the sections 13—13 hereinbefore described. The upper shell, which is also indicated by A', is composed of two similar sections 113—113. Each lower section 113 is provided with an inwardly offset arm member 114 which has an outwardly projecting flange 115 at the upper end. The arm 114 is telescoped within the lower end of the corresponding section 113 of the upper shell A'. The section 113 of the upper shell has an inturned flange 116 at the lower end which cooperates with the flange 115 to limit longitudinal separation of the upper and lower shell sections. As shown, the arm 114 is preferably of curved cross-section, that is, of part cylindrical form. The flange 115 at the upper end of each arm 114 is of arc shape so as to properly cooperate with the flange 116 which is also arc-shaped.

It will be understood that both shells A'—A' of the form of the invention illustrated in Figure 5 are provided with interior friction surfaces and have flanges at their outer ends which cooperate with a spring surrounding the shells, which spring is similar to the spring D, hereinbefore described in connection with Figures 1 to 4 inclusive. The mechanism is further provided with wedge members, friction shoes, an inner spring, and cooperating spring followers in all respects similar to the corresponding parts hereinbefore mentioned in connection with Figures 1 to 4 inclusive.

I have herein shown and described what I now consider the preferred manner of carrying out my invention, but the same is merely illustrative and I contemplate all changes and modifications that come within the scope of the claims appended hereto.

I claim:

1. In a friction shock absorbing mechanism, the combination with a pair of friction shells at opposite ends of the mechanism movable toward and away from each other, said shells having interior friction surfaces; of a set of shoes at each end of the mechanism having frictional engagement with the friction surfaces of the shell at the corresponding end of the mechanism; wedge blocks at opposite ends of the mechanism projecting outwardly of the shells to receive the actuating force and movable inwardly of the corresponding shell, said blocks having wedging engagement with the shoes; spring means within the shells opposing relative approach of the sets of shoes; and a spring surrounding said shells and having shouldered engagement therewith for opposing relative approach of the same.

2. In a friction shock absorbing mechanism interposed between two relatively movable members, the combination with a pair of friction shells at opposite ends of the mechanism movable toward and away from each other, and normally spaced from said members, each shell having interior friction surfaces, each shell also having an abutment flange at the outer end thereof; of a spring resistance surrounding said shells and having shouldered engagement at opposite ends with the abutment flanges of the shells respectively; a set of shoes at each end of the mechanism having frictional engagement with the interior surfaces of the shell at the corresponding end of the mechanism; wedge blocks at opposite ends of the mechanism receiving the actuating force directly from said relatively movable members and having wedging engagement respectively with said sets of shoes, said wedge blocks and shoes being movable inwardly of said shells; and spring means within the shells opposing relative approach of said sets of shoes.

3. In a friction shock absorbing mechanism, the combination with a pair of friction shells at opposite ends of the mechanism; of means for limiting relative separation of said shells lengthwise of the mechanism to an extent less than the full compression stroke of the mechanism; a set of friction shoes cooperating with each shell; spring means opposing relative approach of said sets of shoes and also opposing relative approach of said shells; and friction wedge means at opposite ends of the mechanism adapted to receive the actuating force and having wedging engagement with the sets of shoes respectively.

4. In a friction shock absorbing mechanism opposing relative approach of two members, the combination with sectional friction shells at opposite ends of the mechanism normally spaced from said members and movable toward each other lengthwise of the same, each shell having interior friction surfaces; of a relatively heavy spring enclosing the sectional shells and opposing expansion of the same, said spring having shouldered engagement with the shells and yieldingly opposing relative approach of the same; friction shoes cooperating with the interior friction surfaces of each shell; additional spring means opposing relative movement of the shoes toward each other lengthwise of the mechanism; and wedge means at opposite ends of the mechanism engaged by said members for forcing said shoes against the friction surfaces of the shells.

5. In a friction shock absorbing mechanism, the combination with a pair of friction shells at opposite ends of the mechanism, each shell being composed of two sections and each section having an interior friction surface; of a pair of friction shoes cooperating with each shell, said shoes of each pair respectively engaging the interior friction surfaces of the two sections respectively of the cooperating shell; a wedge block at each end of the mechanism projecting outwardly beyond the corresponding shell to receive the actuating force and having wedging engagement with the corresponding pair of shoes; a spring enclosing the friction shells yieldingly opposing expansion of each shell and relative approach of said pair of shells lengthwise of the mechanism; and a second spring within the shells opposing movement of the shoes toward each other lengthwise of the mechanism.

6. In a friction shock absorbing mechanism, the combination with a relatively heavy coil spring; of friction means at opposite ends of the spring, each friction means including a pair of transversely curved friction members telescoped within the corresponding end of the spring, a set of friction shoes having frictional engagement with each pair of friction members, and wedge means engaging the shoes, said wedge means projecting outwardly beyond the outer ends of the friction members to receive the actuating force, said friction members having flanges at their outer ends abutting the corresponding end of the spring; and additional spring means enclosed by said friction members and opposing movement of the friction shoes inwardly of the mechanism.

7. In a friction shock absorbing mechanism, the combination with a relatively heavy coil spring; of friction means at opposite ends of the spring, each friction means including a pair of transversely curved friction members telescoped within the corresponding end of the spring, friction shoes having frictional engagement with each friction member and wedge means engaging the shoes, said friction members having flanges at their outer ends abutting the corresponding end of the spring; additional spring means enclosed by said friction members and opposing movement of the friction shoes inwardly of the mechanism; and means for limiting relative separation of said friction members lengthwise of the mechanism comprising arms on one of said sets of members slidable with respect to the other set of members and having shouldered engagement with the latter.

ARNOLD E. DENTLER.